(12) United States Patent
Shimizu

(10) Patent No.: US 10,209,980 B2
(45) Date of Patent: Feb. 19, 2019

(54) IMAGE FORMING APPARATUS AND CONTROL METHOD FOR IMAGE FORMING APPARATUS

(71) Applicant: CANON KABUSHIKI KAISHA, Tokyo (JP)

(72) Inventor: Shota Shimizu, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/916,973

(22) PCT Filed: Sep. 2, 2014

(86) PCT No.: PCT/JP2014/004505
§ 371 (c)(1),
(2) Date: Mar. 4, 2016

(87) PCT Pub. No.: WO2015/033554
PCT Pub. Date: Mar. 12, 2015

(65) Prior Publication Data
US 2016/0196130 A1    Jul. 7, 2016

(30) Foreign Application Priority Data

Sep. 9, 2013   (JP) ................................ 2013-186433

(51) Int. Cl.
G06F 9/44      (2006.01)
G06F 8/65      (2018.01)
G06F 21/57     (2013.01)

(52) U.S. Cl.
CPC .............. G06F 8/65 (2013.01); G06F 21/572 (2013.01)

(58) Field of Classification Search
CPC ........................................................ G06F 9/44
USPC .................................................. 717/168–173
See application file for complete search history.

(56) References Cited

U.S. PATENT DOCUMENTS

| 7,051,001 B1* | 5/2006 | Slater ..................... G06Q 20/02 705/26.1 |
| 8,654,372 B2* | 2/2014 | Ukegawa .................. G06F 8/65 358/1.13 |
| 2002/0140966 A1* | 10/2002 | Meade, II ............. G06F 9/4415 358/1.15 |
| 2004/0250116 A1* | 12/2004 | Strickland ........... H04L 63/1433 726/25 |

(Continued)

FOREIGN PATENT DOCUMENTS

| JP | 2007-11944 A | 1/2007 |
| JP | 2008-112297 A | 5/2008 |

(Continued)

OTHER PUBLICATIONS

Baba, Tatsuya, "Tips for DNS Settings: Grasping the Essentials", Network World, (Nov. 2003), pp. 94-97.

(Continued)

*Primary Examiner* — Jae U Jeon
(74) *Attorney, Agent, or Firm* — Canon U.S.A., Inc. I.P. Division

(57) ABSTRACT

If firmware installed in an image forming apparatus 100 is a firmware having a security specification configuration, an operator who is permitted to instruct to update the firmware in the image forming apparatus 100 is limited to an operator having an administrator authority. This may improve the security of the image forming apparatus.

11 Claims, 13 Drawing Sheets

(56) References Cited

U.S. PATENT DOCUMENTS

| | | | |
|---|---|---|---|
| 2005/0219076 A1* | 10/2005 | Harris | G06F 17/30067 341/51 |
| 2006/0031830 A1* | 2/2006 | Chu | G06F 21/10 717/174 |
| 2006/0184929 A1* | 8/2006 | Ohtsuka | G06F 8/65 717/168 |
| 2006/0200814 A1* | 9/2006 | Kontinen | G06F 8/61 717/168 |
| 2007/0083518 A1* | 4/2007 | Mason | G06F 8/61 |
| 2007/0285702 A1* | 12/2007 | Akiyoshi | G06F 21/608 358/1.14 |
| 2008/0250403 A1* | 10/2008 | Moon | G06F 8/30 717/169 |
| 2009/0150880 A1* | 6/2009 | Park | G06F 8/61 717/174 |
| 2010/0245897 A1* | 9/2010 | Ando | H04N 1/0097 358/1.15 |
| 2013/0263212 A1* | 10/2013 | Faltyn | H04W 12/08 726/1 |
| 2014/0181801 A1* | 6/2014 | Voronkov | G06F 8/61 717/177 |
| 2014/0215620 A1* | 7/2014 | Hayrynen | H04L 63/1416 726/23 |

FOREIGN PATENT DOCUMENTS

| | | |
|---|---|---|
| JP | 2008-168561 A | 7/2008 |
| JP | 2010-225117 A | 10/2010 |

OTHER PUBLICATIONS

Mitsubishi Electric Technical Journal, Vo. 87, No. 7, (2010), p. 12 (380).
Network magazine, Jan. 2009, p. 99.
J.P. Pat. Pub. No. 2013-186433, Notification of Reason for Refusal, dated Jun. 26, 2017.

* cited by examiner

[Fig. 1]
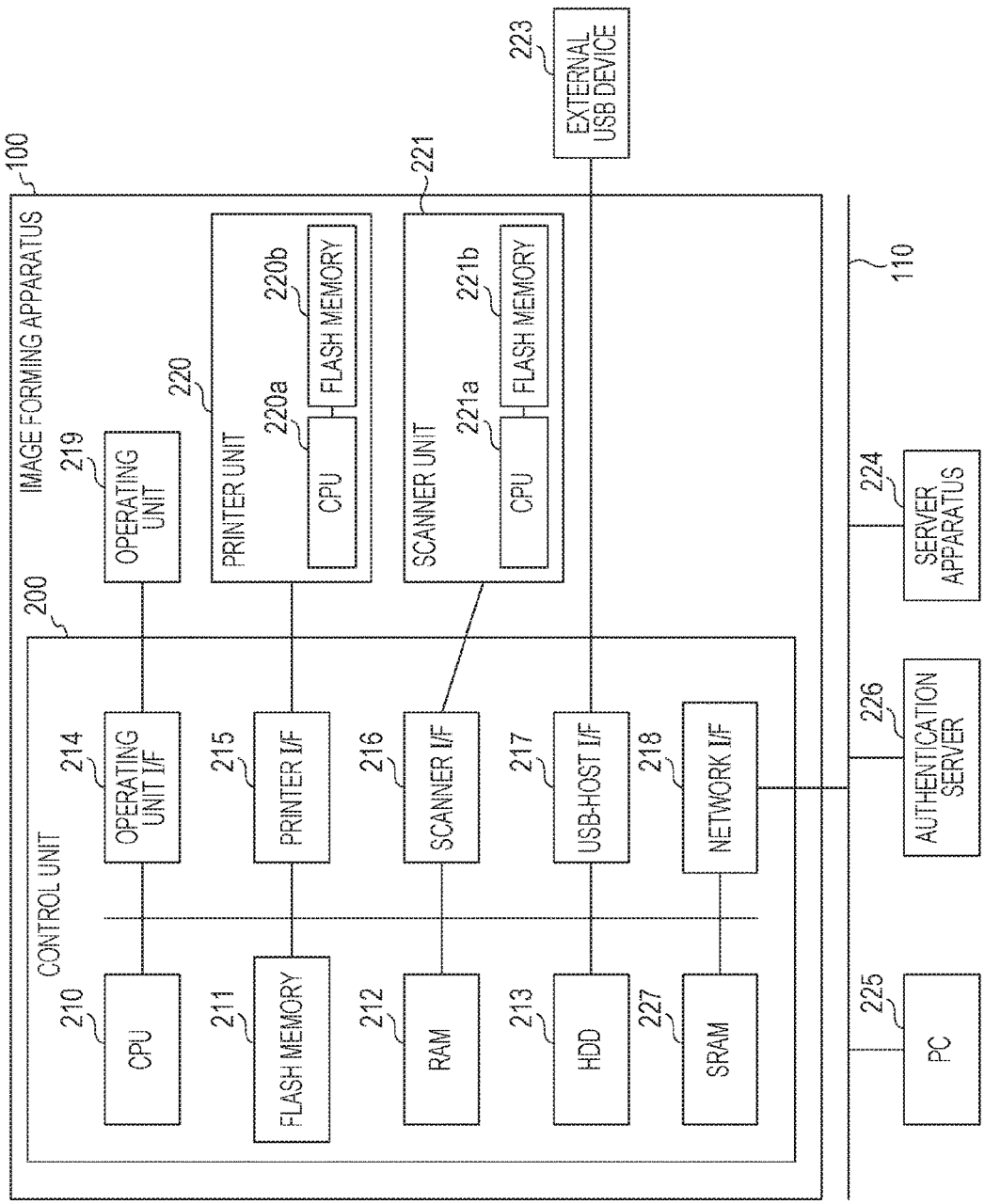

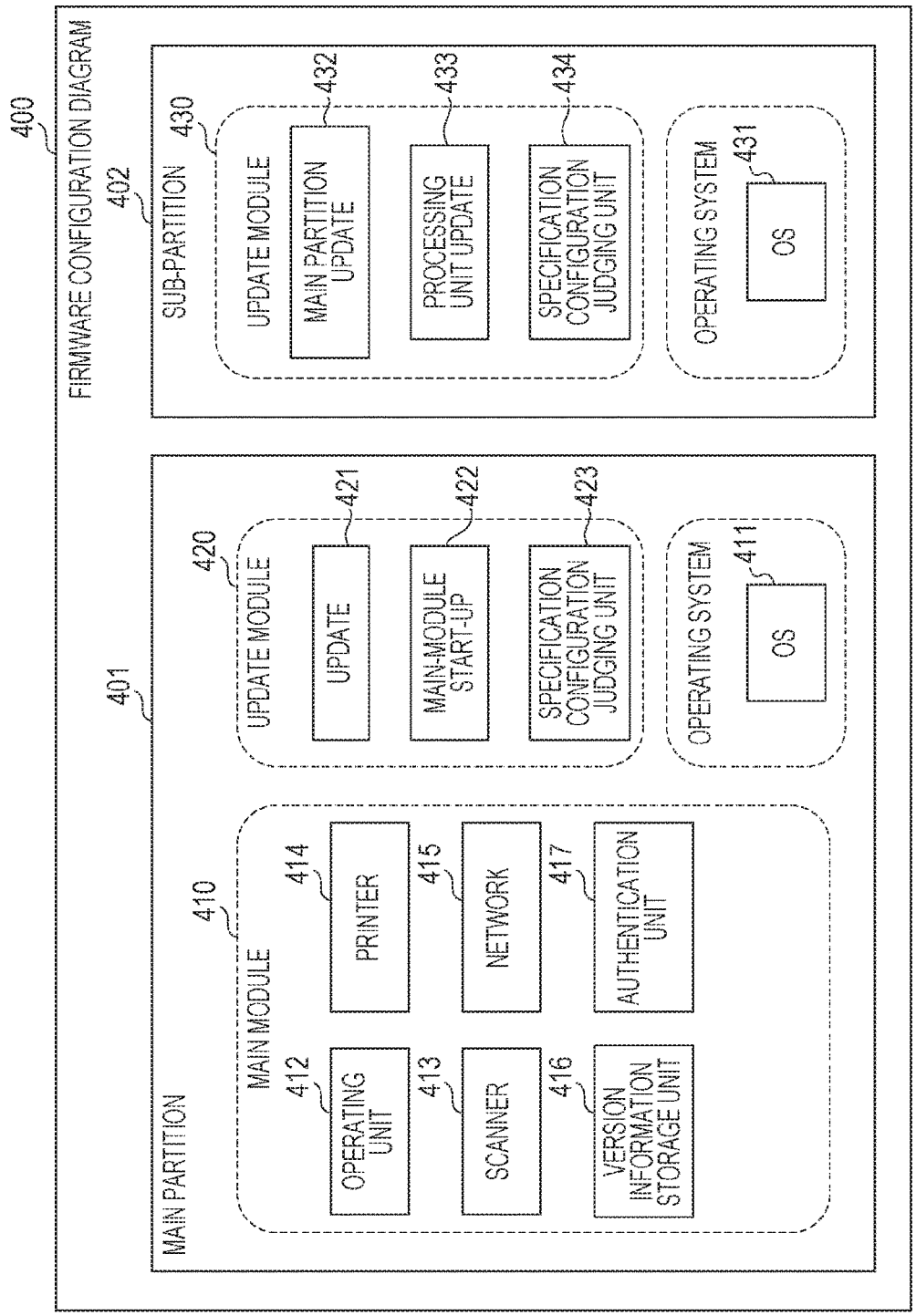
[Fig. 2]

| IDENTIFICATION VALUE | 0 OR 1 | ⟵ 302 |

[Fig. 4A]

| CONTENTS LIST ||
| FIRMWARE TYPE | VERSION |
| FIRMWARE TYPE = 1 | 9.0 |

| MAIN-BODY CONTROLLER ||
| MODULE NAME | VERSION |
| OS | 0.90 |
| OPERATING UNIT | 0.90 |
| SCANNER | 0.90 |
| PRINTER | 0.90 |
| NETWORK | 0.90 |
| UPDATE | 0.90 |
| START-UP PREPARATION | 0.90 |
| MAIN UPDATE | 0.90 |
| PROCESSING UNIT UPDATE | 0.90 |

| PRINTER UNIT PROGRAM ||
| DCOND | 0.90 |

| SCANNER UNIT PROGRAM ||
| SCOND | 0.90 |

[Fig. 4B]

| CONTENTS LIST | |
|---|---|
| FIRMWARE TYPE | VERSION |
| FIRMWARE TYPE = 1 | 9.1 |

| MAIN-BODY CONTROLLER | |
|---|---|
| MODULE NAME | VERSION |
| OS | 0.90 |
| OPERATING UNIT | 0.90 |
| SCANNER | 0.90 |
| PRINTER | 0.91 |
| NETWORK | 0.90 |
| UPDATE | 0.90 |
| START-UP PREPARATION | 0.90 |
| MAIN UPDATE | 0.90 |
| PROCESSING UNIT UPDATE | 0.90 |

| PRINTER UNIT PROGRAM | |
|---|---|
| DCOND | 0.90 |

| SCANNER UNIT PROGRAM | |
|---|---|
| SCOND | 0.90 |

[Fig. 4C]

| CONTENTS LIST | |
|---|---|
| FIRMWARE TYPE | VERSION |
| FIRMWARE TYPE = 0 | 10.0 |

| MAIN-BODY CONTROLLER | |
|---|---|
| MODULE NAME | VERSION |
| OS | 10.0 |
| OPERATING UNIT | 10.0 |
| SCANNER | 10.0 |
| PRINTER | 10.0 |
| NETWORK | 10.0 |
| UPDATE | 10.0 |
| START-UP PREPARATION | 10.0 |
| MAIN UPDATE | 10.0 |
| PROCESSING UNIT UPDATE | 10.0 |

| PRINTER UNIT PROGRAM | |
|---|---|
| DCOND | 10.0 |

| SCANNER UNIT PROGRAM | |
|---|---|
| SCOND | 10.0 |

[Fig. 4D]

| CONTENTS LIST | |
|---|---|
| FIRMWARE TYPE | VERSION |
| FIRMWARE TYPE = 0 | 10.1 |

| MAIN-BODY CONTROLLER | |
|---|---|
| MODULE NAME | VERSION |
| OS | 10.0 |
| OPERATING UNIT | 10.0 |
| SCANNER | 10.0 |
| PRINTER | 10.1 |
| NETWORK | 10.0 |
| UPDATE | 10.0 |
| START-UP PREPARATION | 10.0 |
| MAIN UPDATE | 10.0 |
| PROCESSING UNIT UPDATE | 10.0 |

| PRINTER UNIT PROGRAM | |
|---|---|
| DCOND | 10.0 |

| SCANNER UNIT PROGRAM | |
|---|---|
| SCOND | 10.0 |

[Fig. 5]
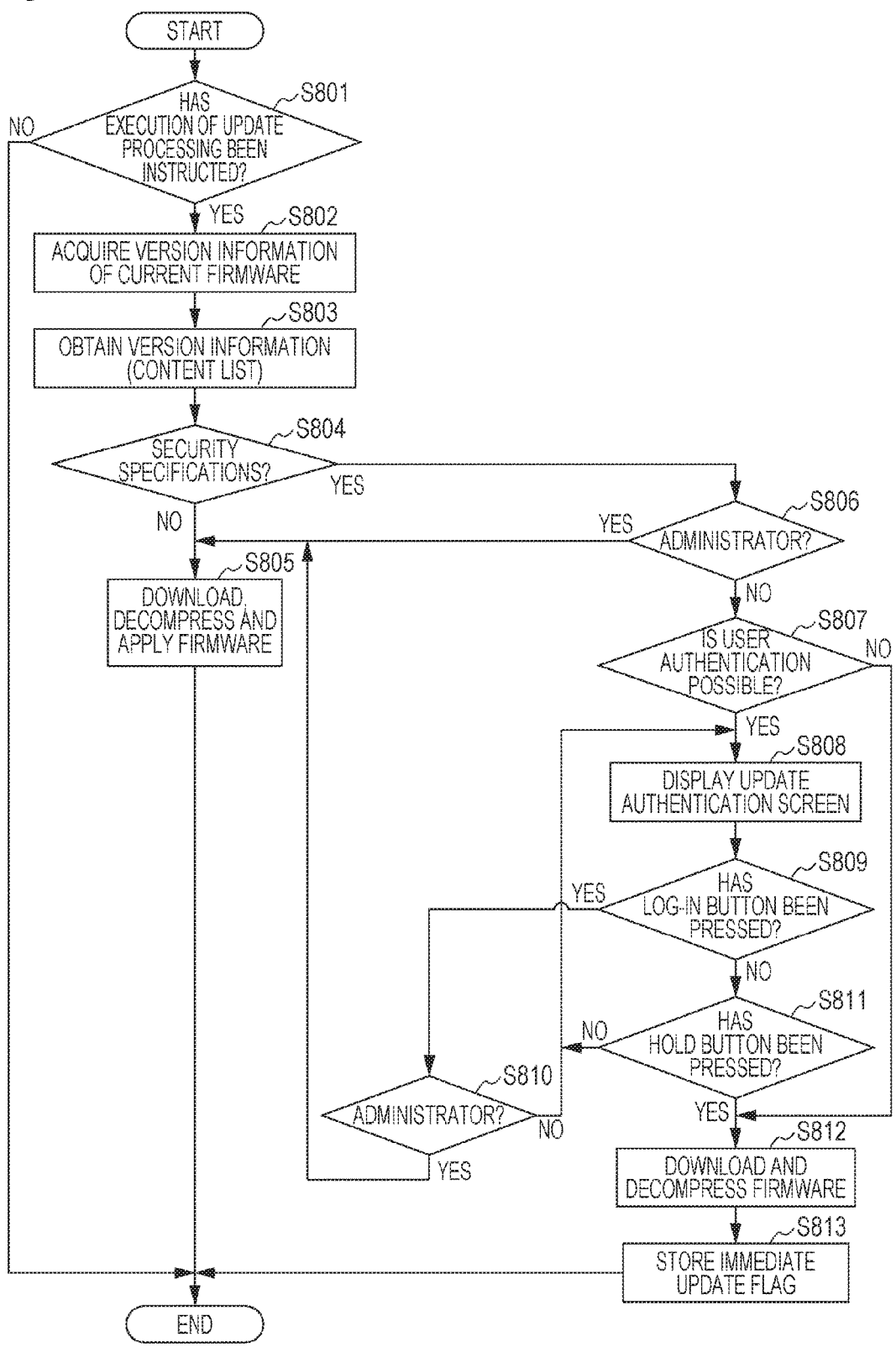

[Fig. 6]
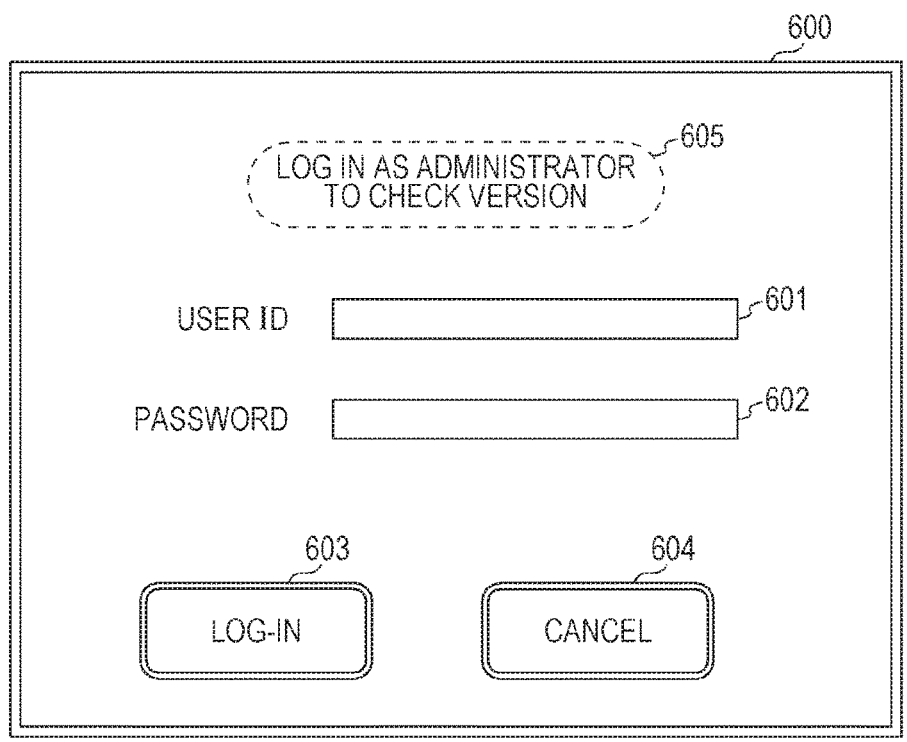
[Fig. 7A]
|  | FIRMWARE UPDATE INSTRUCTED BY | | |
| --- | --- | --- | --- |
|  | ADMINISTRATOR | GENERAL USER | NONE |
| PC | YES | YES | NO |
| SERVER | YES | YES | YES/NO |
| EXTERNAL USB DEVICE | YES | YES | NO |
[Fig. 7B]
|  | FIRMWARE UPDATE INSTRUCTED BY | | |
| --- | --- | --- | --- |
|  | ADMINISTRATOR | GENERAL USER | NONE |
| PC | YES | NO | NO |
| SERVER | YES | NO | NO |
| EXTERNAL USB DEVICE | YES | NO | NO |

[Fig. 8]
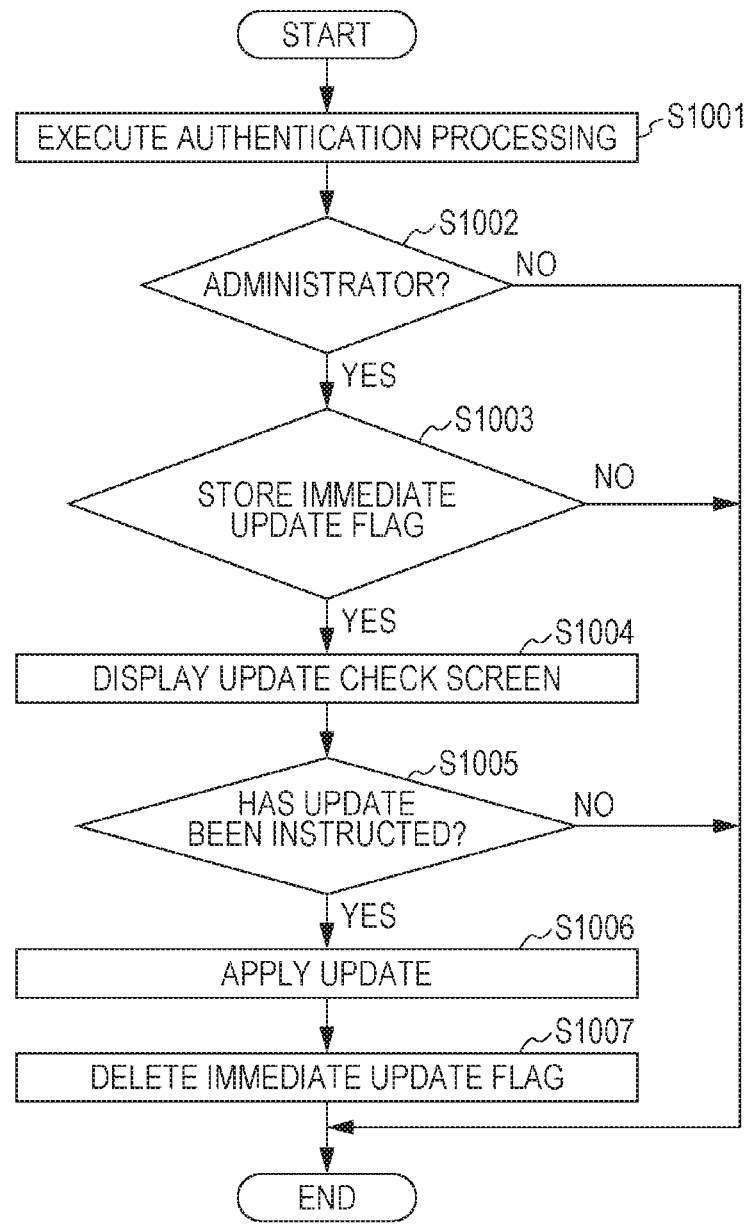

[Fig. 9]
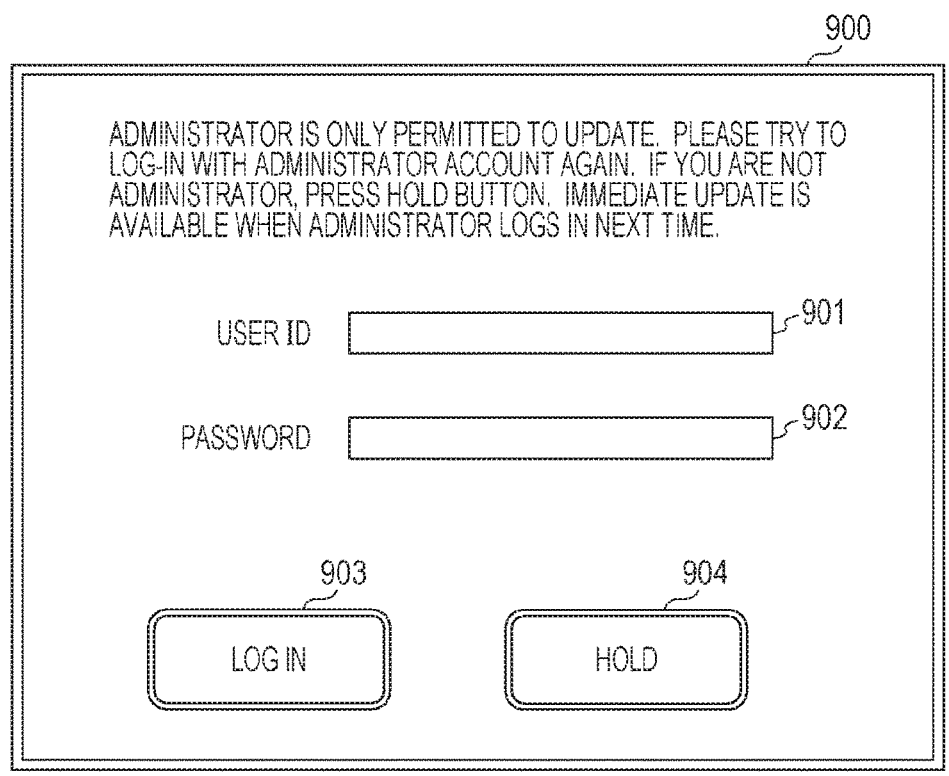

[Fig. 10]
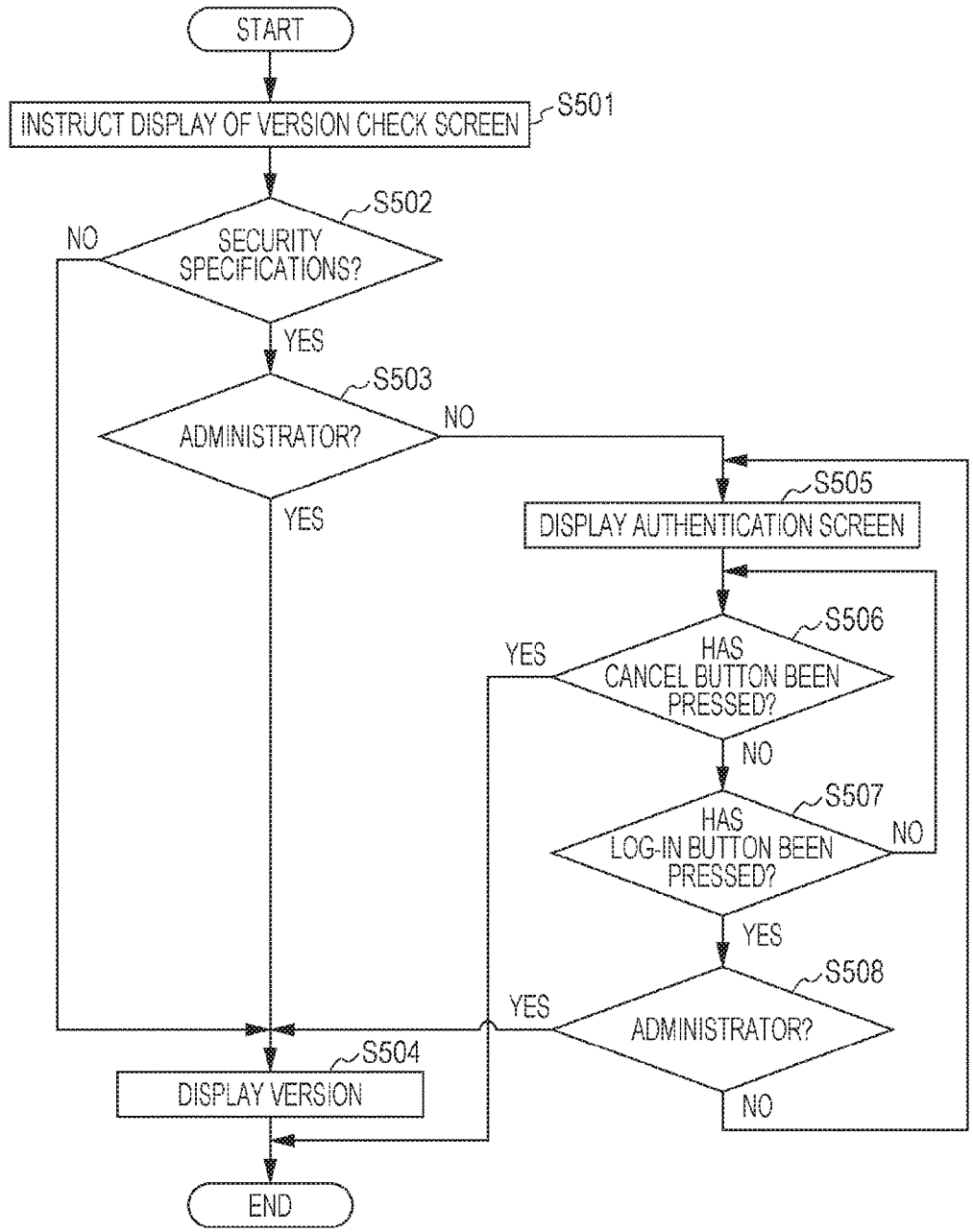

[Fig. 11]
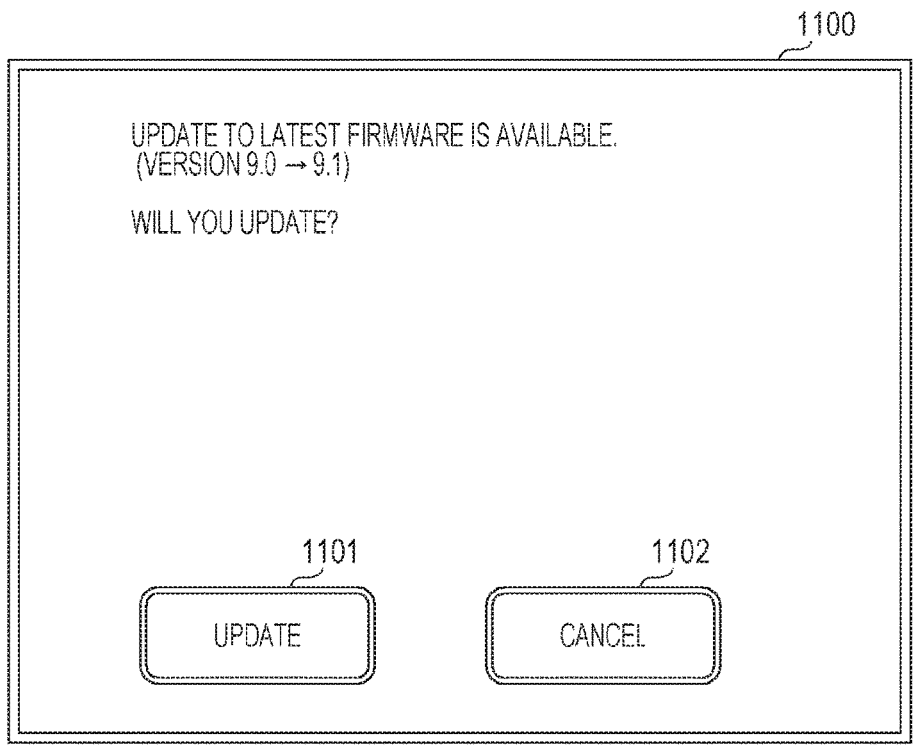
[Fig. 12]
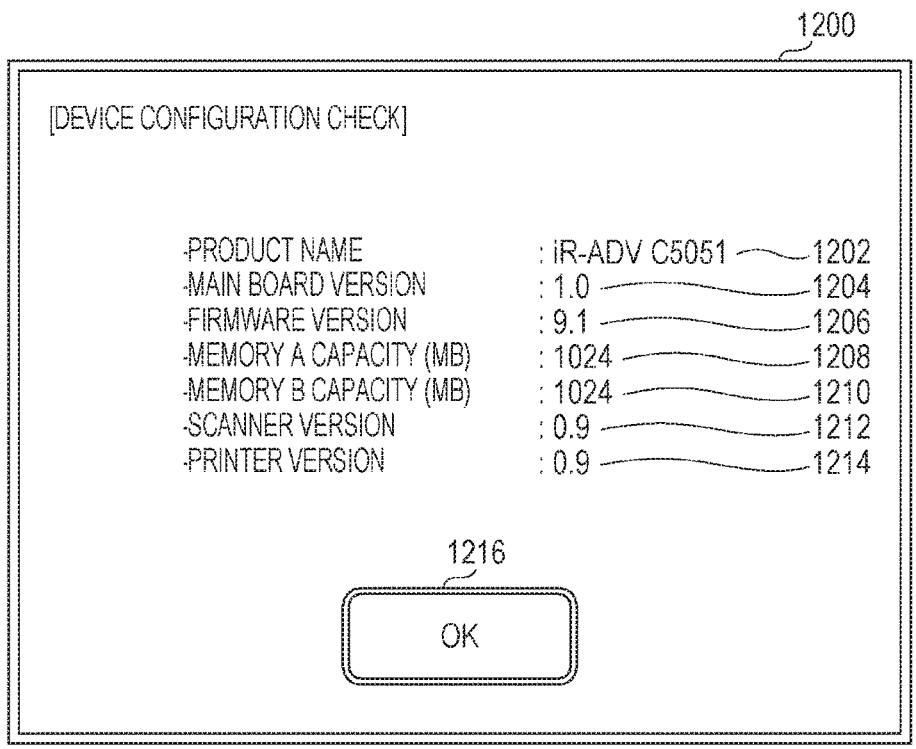

[Fig. 13]
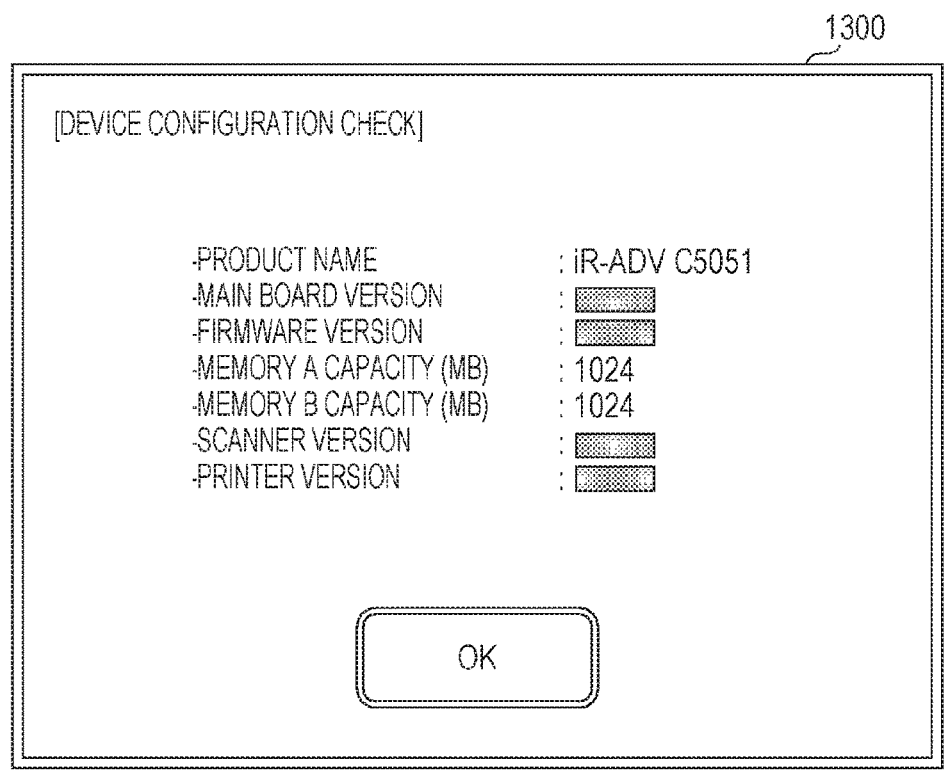

IMAGE FORMING APPARATUS AND CONTROL METHOD FOR IMAGE FORMING APPARATUS

TECHNICAL FIELD

The present invention relates to an image forming apparatus in which update of firmware is allowed.

BACKGROUND ART

Firmware update may be performed in an image forming apparatus such as a copy machine and a MFP (Multi Function Peripheral).

Operators of an image forming apparatus may include a general user who normally uses the apparatus, an administrator who manages security settings for the apparatus, and a service man who is responsible for maintenance and repairmen of the apparatus, for example. For a conventional image forming apparatus, an administrator may update firmware therein, or a service man may update firmware as a part of a maintenance work for the apparatus.

According to PTL 1, when firmware is downloaded over a network, a firmware program may be encrypted so that manipulation of the firmware may be prevented, which may thus allow prevention of invalid upgrading.

Generally, firmware for image forming apparatuses is managed based on its version, and a device is available for checking the version of the firmware. An operator may check the version of an image forming apparatus to determine the necessity of any update. Also in a conventional image forming apparatus, a general user, an administrator and a service man may be allowed to check the version of the firmware.

Desirably, a valid administrator may only be permitted to check the version of firmware. If anybody is permitted to check the version of firmware, image forming apparatuses which are left vulnerable without firmware update may easily be searched, which is not suitable for security.

CITATION LIST

Patent Literature

PTL 1: Japanese Patent Laid-Open No. 2007-11944

SUMMARY OF INVENTION

Technical Problem

Even among image forming apparatuses of one model, some may have a stricter security specification while others may have a general security specification. Which specifications of image forming apparatus are to be selected may depend on installation principles of a user of the image forming apparatus. A security specification configuration of an image forming apparatus will be described below. The term "security specification configuration" refers to a configuration of an image forming apparatus in which firmware for which a security specification is strictly defined is installed. An image forming apparatus having a security specification configuration may have tightened functions for security including user authentication, data encryption, and data input/output management. For example, such a security specification configuration may be implemented in an image forming apparatus in which firmware authenticated under the IEEE2600 standard is installed or an image forming apparatus in which special firmware for a specific client who requests a high level of security is installed.

In a case where firmware update based on operator's authority is not limited, a non-administrator user may install firmware having a general specification configuration in an image forming apparatus having a security specification configuration. As a result, the image forming apparatus is changed from its security specification configuration to the general specification configuration, which may reduce the security for the image forming apparatus.

Solution to Problem

An image forming apparatus of the present invention limns an operator who updates firmware based on a specification configuration of the image forming apparatus. Thus, the security for the image forming apparatus may be improved.

An image forming apparatus according to the present invention is an image forming apparatus in which firmware update is allowed, the apparatus including an update unit configured to update firmware in the image forming apparatus, a receiving unit configured to receive an instruction to update the firmware in the image forming apparatus, an identifying unit configured to identify an authority of an operator of the image forming apparatus, and a limiting unit configured to limit update of the firmware in the image forming apparatus performed by the update unit if firmware installed in the image forming apparatus is firmware of a specific type and if the authority of the operator of the image forming apparatus identified by the identifying unit is not a predetermined authority.

Further features of the present invention will become apparent from the following description of exemplary embodiments with reference to the attached drawings.

BRIEF DESCRIPTION OF DRAWINGS

FIG. 1 is a block diagram illustrating an example of a configuration of an image forming system.

FIG. 2 illustrates an example of a configuration of firmware in an image forming apparatus according to an embodiment.

FIG. 3 illustrates an example of firmware type information according to an embodiment.

FIG. 4A illustrates an example of a content list according to an embodiment.

FIG. 4B illustrates an example of a content list according to an embodiment.

FIG. 4C illustrates an example of a content list according to an embodiment.

FIG. 4D illustrates an example of a content list according to an embodiment.

FIG. 5 is a flowchart illustrating an example of firmware update processing according to an embodiment.

FIG. 6 illustrates an example of an authentication screen according to an embodiment.

FIG. 7A illustrates an example of a table showing firmware updatability according to an embodiment.

FIG. 7B illustrates an example of a table illustrating firmware updatability according to an embodiment.

FIG. 8 is a flowchart illustrating an example of immediate update processing according to an embodiment.

FIG. 9 illustrates an example of an update authentication screen according to an embodiment.

FIG. 10 is a flowchart illustrating an example of processing for checking version of firmware according to an embodiment.

FIG. 11 illustrates an example of an update checking screen according to an embodiment.

FIG. 12 illustrates an example of firmware version information screen according to an embodiment.

FIG. 13 illustrates an example of a screen to be displayed on an operation unit according to an embodiment.

DESCRIPTION OF EMBODIMENT

The best modes for embodying the present invention will be described below with reference to drawings.

An embodiment applied to an image forming apparatus will be described in detail. It should be noted that the following embodiments are not intended to limit the claimed present invention and that all combinations of characteristics described according to embodiments are not required for the present invention.

The best modes for embodying the present invention will be described below with reference to drawings.

FIG. 1 is a block diagram illustrating an example of a configuration of an image forming system according to an embodiment.

Referring to FIG. 1, an image forming apparatus 100, a server apparatus 224, a PC 225, and an authentication server 226 are connected to a LAN 110. According to this embodiment, the image forming apparatus 100 may be a MFP (Multi Function Peripheral) having functions of copy, print, scan and so on. The image forming apparatus 100 may be a SFP (Single Function Peripheral) having a printer function only. The server apparatus 224 stores update firmware for the image forming apparatus 100 and transmits the update firmware to the image forming apparatus 100 in response to a request from the image forming apparatus 100. The PC 225 transmits print data such as PDL to the image forming apparatus 100 and causes the image forming apparatus 100 to print. The authentication server 226 performs user authentication based on authentication information (such as user ID and password) transmitted from the image forming apparatus 100 and transmits information describing success/failure of authentication and information describing a role of the authenticated user if the authentication succeeds. According to this embodiment, roles managed by the authentication server 226 may be two types of administrator and general user, and authorities corresponding to the roles are individually assigned. The types of role are not limited thereto, but other types of role may be provided. The authority to be assigned to an administrator may be higher authority than the authority to be assigned to a general user. The authority to a general user does not allow defining a setting for the image forming apparatus 100 or changing a setting therefor. A general user authority is allowed to use functions (such as copy, scan, print and so on) provided by the image forming apparatus 100. An administrator authority is allowed to define a setting for the image forming apparatus 100 and to change a setting, in addition to the general user authority. The administrator authority is required to define a setting for the image forming apparatus 100 or change a setting.

The authentication server 226 has a user database storing information associated with a user ID, a password (or a hash value of a password), and a user's role for a plurality of users. The image forming apparatus 100 may have the configuration of the authentication server 226.

A control unit 200 in the image forming apparatus 100 may generally control the image forming apparatus 100.

A CPU 210 reads and executes in a RAM 212 a program (firmware in the control unit 200) stored in a flash memory 211.

A hard disk drive (HDD) 213 may store print data received from the PC 225 through a network interface (I/F) 218. It should be noted that programs to be executed by the CPU 210 may include an application program for printing. The application program for printing converts print data stored in the HDD 213 to image data that are printable by a printer unit 220. The HDD 213 further stores image data that are printable by the printer unit 220. Programs executable by the CPU 210 may include an application program for scanning. The application program for scanning may cause a scanner unit 221 to read image data and transfer the read image data to the HDD 213. It should be noted that the flash memory 211 or HDD 213 may be an SSD (Solid State Drive). The control unit 200 may be configured to have a plurality of CPUs. In this case, a plurality of flash memories may be provided correspondingly to the CPUs.

An operation unit interface (I/F) 214 transmits an instruction input from an operator of the image forming apparatus 100 through the operation unit 219 to the CPU 210. The operation unit I/F 214 receives from the CPU 210 an instruction for switching a content displayed on a display unit included in the operation unit 219 and transmits it to the operation unit 219.

A printer interface (I/F) 215 is an interface usable for connecting the control unit 200 and the printer unit 220. The printer unit 220 performs a printing process on a sheet based on image data transferred from the HDD 213 through the printer I/F 215. The printer unit 220 has a CPU 220a and a flash memory 220b. The CPU 220a may execute a program (firmware in the printer unit 220) stored in the flash memory 220b to cause the printer unit 220 to perform an operation involved in the printing process.

A scanner interface (I/F) 216 is an interface usable for connecting the control unit 200 and the scanner unit 221. The scanner unit 221 (input unit for inputting image data) may read an image on a document by using an optical sensor configured by a CCD (Charge Coupled Device), for example. The scanner unit 221 transfers image data generated by reading an image on a document to the HDD 213 through the scanner I/F 216. The image data transferred and stored to the HDD 213 is printable by the printer unit 220. Image data read by the scanner unit 221 may be printed by the printer unit 220 so that a copy process may be performed. The scanner unit 221 has a CPU 221a and a flash memory 221b. The CPU 221a may execute a program (firmware in the scanner unit 221) stored in the flash memory 221b to cause the scanner unit 221 to perform an operation involved in a scan process.

A USB host interface (USB-Host I/F) 217 is an interface usable for connecting the control unit 200 and an external USB device 223. Here, the external USB device 223 may be a USB memory or a USB keyboard, for example. Update firmware may be stored in a USB memory and may be downloaded to the image forming apparatus 100 to update the firmware.

The SRAM 227 may store update states of programs for a main partition and a sub-partition, which will be described below, and information on the configuration, state, and settings of the image forming apparatus 100. It should be noted that the information on the configuration, state, and settings of the image forming apparatus 100 may be stored in the HDD 213.

It should be noted that while, according to this embodiment, three CPUs of the CPU 210 for the control unit 200, the CPU 220a for the printer unit 220, and the CPU 221a for the scanner unit 221 are provided, an embodiment of the present invention is not limited to such a configuration. For example, it may be configured such that one CPU may control the control unit 200, printer unit 220 and scanner unit 221.

Next, a configuration of a program to be executed by the CPU 210 for the control unit 200 will be described with reference to FIG. 2.

FIG. 2 illustrates an example of a configuration of firmware in the image forming apparatus of this embodiment.

According to this embodiment, a program illustrated in FIG. 2 is stored in the flash memory 211 in FIG. 1.

A program stored in the flash memory 211 is divided into two partitions on the flash memory 211. One partition is a main partition 401, and the other one is a sub-partition 402. In order to cause the image forming apparatus 100 to perform normal operations, the CPU 210 is caused to execute an operating system 411 (hereinafter, called an OS) stored in the main partition. On the other hand, in order to update a program (program stored in the main partition 401) for causing the image forming apparatus 100 to perform normal operations, the CPU 210 is caused to execute the OS stored in the sub-partition.

The main partition 401 contains three types of program module of the OS 411, a main module 410 and an update module 420. The OS 411 is a program for controlling the image forming apparatus 100 and includes a driver program for controlling operations of the components of the image forming apparatus 100 including the printer unit 220.

The sub-partition 402 contains two program modules of an OS 431 and an update module 430. The OS 431 is an OS for controlling the image forming apparatus 100 and is similar to the OS 411.

The program modules contained in the main module 410 in the main partition 401 will be described below. It should be noted that the program modules are application programs that run on the OS 411 after the OS 411 starts.

An operation unit program 412 contained in the main module 410 is a program which transmits to the CPU 210 an instruction input by an operator of the image forming apparatus 100 through the operation unit 219 and perform a process based on the transmitted instruction. A scan program 413 is a program for controlling a scan process to be performed by the scanner unit 221. A print program 414 is a program for controlling a printing process to be performed by the printer unit 220. A network program 415 is a program for communication with the server apparatus 224, PC 225 and authentication server 226 over the LAN 110. A version information storage unit 416 manages version information on firmware that is a program in the main module 410 in the image forming apparatus 100. The version information of such firmware programs is stored in the flash memory 211 as a content list. The information stored in the version information storage unit 416 may be read by the CPU 210 and be displayed on the operation unit 219. An authentication unit 417 is a program for authenticating an operator based on user information (such as a user ID and a password) input through the operation unit 219.

A update program 421 included in the update module 420 is a program for updating a program contained in the main partition 401 and a program contained in the sub-partition 402. A main-module start-up preparation program 422 contained in the update module 420 is a program for performing an initialize process necessary for the CPU 210 to execute the main module 410.

A specification configuration determining unit 423 may determine whether the image forming apparatus 100 has a security specification configuration or not or whether the version of a firmware program to be updated has a security specification configuration or not.

Next, program modules contained in the update module 430 in the sub-partition 402 will be described. It should be noted the program modules are application programs that run on the OS 431 after the OS 431 starts up.

A main-partition update program 432 is a program for updating a program contained in the main partition 401. A processing unit update program 433 is a program contained in the flash memory 220b for updating processing unit program (a program for controlling the printer unit 220 to execute a printing process). A specification configuration determining unit 434 determines whether the image forming apparatus 100 has a security specification configuration or not, like the specification configuration determining unit 423 in the main partition.

It should be noted that the program modules illustrated in FIG. 2 are given for illustration purpose only, and program modules different from those in FIG. 2 may be contained.

FIG. 3 illustrates an example of firmware type information according to this embodiment. Firmware type information 300 contains an identification value 302 that is information describing the type of firmware installed in the image forming apparatus 100. The firmware type information 300 is stored on the version information storage unit 416 in the flash memory 211. The identification value 302 contained in the firmware type information 300 may be a value of "0" or "1". The value "1" corresponds to the identification value 302 for firmware having a security specification configuration, the value "0" corresponds to the identification value 302 for firmware having a general specification configuration. The identification value may be contained in the content list in FIG. 4, which will be described below (where firmware type corresponds to a value subsequent to "="). In order to update a firmware program, update processing is controlled based on the identification value 302 contained in the firmware type information 300 and the identification value contained in the content list. The identification value 302 may be changed when the type of firmware installed in the image forming apparatus 100 is changed. It should be noted that while, according to this embodiment, a plurality of firmware types such as firmware having a security specification configuration and firmware having a general specification configuration for illustration purpose, other types of firmware may be used. For example, a type of firmware customized for a specific destination. The firmware type information 300 may be stored in the HDD 213 or SRAM 227. The identification value 302 may be changed in response to an operation performed by using the operation unit 219.

FIG. 4 illustrated an example of a content list of this embodiment. The content list may be information describing versions of a plurality of firmware programs in the image forming apparatus 100. The content list may contain the identification value. The content list may contain information describing a version of a combination of a plurality of firmware programs. A combination of a plurality of firmware programs shown on the content list will be called a package. The content list corresponding to a plurality of firmware programs installed in the image forming apparatus 100 may be stored in the flash memory 211 in the image forming apparatus. In order to update firmware in the image forming apparatus 100, a package containing a plurality of firmware programs and a content list is externally acquired.

FIG. 4A illustrates a content list where an identification value of firmware type information is 1, that is, a content list for security specification configuration firmware. The version of the package in FIG. 4A is 9.0.

Because the identification value of the firmware type information is 1 in FIG. 4B, the version of the package that is a content list of the security specification configuration firmware is 9.1. If the package corresponding to the content list in FIG. 4A is installed in the present image forming apparatus 100, the package corresponding to the content list in FIG. 4B is to be newly updated. The CPU 210 compares the content list in FIG. 4A and the content list in FIG. 4B to determine that the version of the print module has been updated.

FIG. 4C illustrates a content list where the identification value of firmware type information is 0, that is, for general specification configuration firmware. The version of the package in FIG. 4C is 10.0.

FIG. 4D illustrates a content list where the identification value of firmware identification information is 0, that is, for general configuration firmware. The version of the package is 10.1. The package corresponding to the content list in FIG. 4D is a package for updating the package corresponding to the content list in FIG. 4C. The CPU 210 compares the content list in FIG. 4C and the content list in FIG. 4D to determine that the version of the print module has been updated from 10.0 to 10.1.

Even in one print module, when an updated print module for general specification configuration firmware is applied to firmware having its identification value indicative of a security specification configuration, the security state of the image forming apparatus 100 may not be maintained. For update of firmware in the image forming apparatus 100, the package before the update and the package after the update may be required to have identical firmware type information.

Next, a firmware update method in the image forming apparatus 100 will be described. The image forming apparatus 100 has the following two patterns of firmware update method.

According to a first method, in response to an operation performed by an administrator, for example, from the operation unit 219 in the image forming apparatus 100, a package for update firmware is first downloaded from an external USB device 223 or the PC 225 or the server apparatus 224 through the network I/F 218 into the HDD 213. The package may be compressed or may be encrypted with a predetermined encryption key. The downloaded package is then decompressed or decrypted, and a program area in the update program 421 in the update module 420 is changed.

According to a second method, the update module 420 sets the date and time of distribution of an update package and the date and time of rewriting on a program area. The update package is downloaded from the server apparatus 224 on the set distribution date and time and is changed on the set rewriting date and time. In the second method, the download, expansion and rewriting on a package are performed in an unattended manner.

While the image forming apparatus 100 of this embodiment applies the two update methods above for updating firmware, other firmware download and firmware update methods and update timings excluding them may be applied.

FIGS. 7A and 7B illustrate examples of a table showing firmware updatability based on a relationship between a location where an update firmware package is stored and an instructor of the firmware update. The table in FIG. 7A is to be applied when firmware having a general specification configuration is installed in the image forming apparatus 100. The table in FIG. 7B is to be applied when firmware having a security specification configuration is installed in the image forming apparatus 100. The tables illustrated in FIGS. 7A and 7B may be stored in the flash memory 211 or HDD 213 in the image forming apparatus 100. In FIGS. 7A and 7B, "YES" indicates that the firmware is updatable while "NO" indicates that the firmware is not updatable.

As illustrated in FIG. 7A, when update firmware is downloaded from a PC or an external USB device, the firmware may be updated if the firmware update is instructed by an administrator or a general user. When update firmware is downloaded from a server apparatus, the firmware may be update if the firmware update is instructed by an administrator or a general user according to the first method. On the other hand, according to the second method, the firmware may be updated in an unattended manner.

On the other hand, as illustrated in FIG. 7B, firmware having a security specification configuration may not be updated if the firmware update is instructed by an administrator regardless of the location where the update firmware is stored. This may prevent changes from a security specification configuration to a general specification configuration.

Next, firmware update processing according to this embodiment will be described.

FIG. 5 illustrates an example of a flowchart showing firmware update processing according to this embodiment. The CPU 210 in the control unit 200 executes a program stored in the flash memory 211 to perform the processing in each step in FIG. 5. It should be noted that the expansion of firmware herein refers to decompression or decryption of downloaded compressed or encrypted firmware (package) and temporarily storage of the resulting firmware in a specific area of the flash memory 211. On the other hand, application of firmware refers to writing the firmware in a program storage area.

In S801, the CPU 210 in response to a predetermined operation on the operation unit 219 performed by an operator determines whether an update processing execution instruction for updating a program in the image forming apparatus 100 has been received or not. Alternatively, the CPU 210 determines whether the current date and time is a preset date and time for downloading firmware from the server apparatus 224. If it is determined that the execution instruction has been received, the processing moves to S802. If not, the processing on the flowchart ends.

In S802, the CPU 210 executes the update program 421 through the OS 411 to acquire version information on each firmware program installed in the flash memory 211, flash memory 220b, and flash memory 221b. The version information on each firmware program is stored in the flash memory 211 and may be acquired from a content list managed by the version information storage unit 416.

Next in S803, the CPU 210 acquires a content list of an updated firmware program from the external USB device 223, PC 225, or server apparatus 224. In S804, the CPU 210 reads information on the content list managed by the version information storage unit 416 and determines whether the image forming apparatus 100 has a security specification configuration or not. If so in S804, the CPU 210 in S805 downloads, expands and applies the firmware corresponding to the content list acquired in S803. Then, the processing on the flowchart ends.

On the other hand, if it is determined in S804 that the image forming apparatus 100 has a security specification configuration, the processing moves to S806 where the CPU 210 determines whether the image forming apparatus 100 authenticates an operator having an administrator authority or not. If it is determined in S806 that an operator having an administrator authority is not authenticated, the processing moves to S807 where the CPU 210 determines whether a request for a user authentication is allowed or not. If firmware update has been instructed from the operation unit 219 or PC 225, it is determined that a request for a user authentication for an operator who operates the operation unit 219 or PC 225 is allowed, and the processing moves to S808. On the other hand, in a case where update firmware distribution date and time and a program area rewriting date and time are preset in the update module 420 and the update processing is performed in an unattended manner in response to the determination performed by the CPU 210, it is determined that a request for a user authentication is not allowed. Then, the processing moves to S812. This embodiment assumes that firmware may be downloaded and be expanded but not be applied in an unattended manner for a security specification configuration. Alternatively, firmware download in an unattended manner may be inhibited for a security specification configuration. In this case, if the determination result in S806 is not positive, the processing on the flowchart ends.

An update authentication screen 900 is displayed on the operation unit 219 in S808, and the processing moves to S809.

FIG. 9 illustrates an example of an update authentication screen displayed in S808. The image forming apparatus 100 of this embodiment requires an instruction made by an operator having administrator authority for updating firmware having a security specification configuration. Therefore, the update authentication screen 900 is displayed on the operation unit 219 to check the firmware update has been instructed by an operator having administrator authority. If the operator has administrator authority, authentication information for the administrator may be input to a user ID input field 901 and password input field 902 on the update authentication screen 900, and a log in button 903 may be pressed. If the operator does not have administrator authority, the firmware update is not executed even when the authentication information for the user is input. In this case, the operator may press a hold button 904.

S809, whether the log in button 903 in FIG. 9 has been pressed or not is determined. If it is determined in S809 that the log in button has been pressed, the processing moves to S810. In S810, whether the operator having administrator authority has been authenticated or not is determined based on authentication information input on the update authentication screen 900. If it is determined in S810 that the operator having administrator authority has been authenticated, the processing moves to S805 where the download, expansion, and application of the firmware are performed.

If it is determined in S809 where the log in button has not been pressed, the processing moves to S811 where whether the hold button 904 on the update authentication screen 900 has been pressed is determined. It is determined in S811 where the hold button 904 has been pressed, the processing moves to S812. In S812, the package is downloaded and is expanded. Then, the processing moves to S813. It should be noted that the "application" is not performed in S812. In S813, an immediate update flag is stored in a predetermined area of the HDD 213, and the flowchart ends.

The execution of the processing in flowchart in FIG. 5 allows update of firmware having a security specification configuration if it is instructed by an operator having administrator authority.

Next, processing in accordance with the immediate update flag will be described with reference to the flowchart in FIG. 8.

FIG. 8 is a flowchart showing an example of immediate update processing according to this embodiment. The CPU 210 in the control unit 200 executes a program stored in the flash memory 211 to perform the processing in each step in FIG. 8.

First, in S1001, an operator of the image forming apparatus 100 is authenticated. For the operator authentication in S1001, an authentication screen 600 illustrated in FIG. 6 is displayed. However, a message 605 is not displayed in S1001. Authentication information input to the authentication screen 600 is used to authenticate the operator. In S1002, whether the operator has properly been authenticated and whether the authenticated operator has administrator authority or not are determined. In S1002, it is determined that the operator has administrator authority, the processing moves to S1003. If not, that is, if it is determined that the operator has not been properly authenticated or if it is determined that the operator does not have administrator authority through the operator has properly been authenticated, the application of the downloaded firmware is not performed, and the processing in the flowchart ends.

In S1003, the CPU 210 determines whether the immediate update flag is stored in a predetermined area of the HDD 213. If it is determined in S1003 that the immediate update flag is not stored, the CPU 210 ends the flowchart in the flowchart. If it is determined in S1003 that the immediate update flag is stored, the processing moves to S1004. In S1004, the CPU 210 displays an update checking screen (1100 in FIG. 11) on the operation unit 219, and the processing moves to S1005.

FIG. 11 illustrates an example of an update checking screen. If an update button 1101 on the update checking screen 1100 is pressed, it is determined in S1005 that update processing has been instructed. The processing then moves to S1006. On the other hand, if a cancel button 1102 on the update checking screen 1100 is pressed (No in S1005), the processing in the flowchart ends.

In S1006, the CPU 210 applies the firmware expanded in S812. The processing then moves to S1007. In S1007, the CPU 210 delete s the immediate update flag stored in the predetermined area of the HDD 213 and ends the processing in the flowchart.

If an operator does not have administrator authority in the processing in the flowchart in FIG. 5, the downloaded firmware may be processed to its expansion (S812). Then, the processing ends once without applying it. After that, the firmware downloaded and expanded but is not applied by execution of the processing in the flowchart in FIG. 8 based on operations performed by the operator having administrator authority is applied based on an operator having administrator authority. Thus, the firmware having a security specification configuration may be properly updated by the operator having administrator authority.

It has been described above that update of firmware having a security specification configuration in response to an instruction made by an operator having administrator authority. Next, limitation of an operation for checking the version of firmware currently installed in the image forming apparatus 100 under authority of an operator will be described.

FIG. 10 is a flowchart illustrating an example of processing for checking the version of firmware according to this embodiment. The CPU 210 in the control unit 200 executes a program stored in the flash memory 211 to perform the processing in each step in FIG. 10.

First, in S501, a user may operate the operation unit 219 to instruct to display the version, and the CPU 210 receives the instruction to display the version. The processing then moves to S502. In S502, the CPU 210 reads information in the version information storage unit 416 and determines whether the image forming apparatus 100 has a security specification configuration. Whether the image forming apparatus 100 has a security specification configuration or not is determined based on whether the firmware installed in the image forming apparatus is firmware having security specification configuration or not. According to this embodiment, it is determined based on the value of the identification value 302 contained in the firmware type information 300. Alternatively, whether the firmware has a security specification configuration or not is determined based on version information on the firmware installed in the image forming apparatus 100. If it is determined in S502 that the image forming apparatus 100 does not have a security specification configuration (if the image forming apparatus has a general specification configuration, for example), the processing moves to S504. On the other hand, if it is determined in S502 that the image forming apparatus 100 has a security specification configuration, the processing moves to S503.

In S503, the CPU 210 determines whether the operator of the image forming apparatus 100 is an administrator or not. If it is determined in S503 the operator is authenticated and the authenticated operator has administrator authority, the processing moves to S504. In S504, the CPU 210 displays version information on the firmware currently installed in the image forming apparatus 100 on the operation unit 219. On the other hand, if it is determined in S503 that the operator is authenticated but the authenticated operator does not have administrator authority or that the operator is not been authenticated, the processing moves to S505. In S505, the CPU 210 displays an authentication screen for authenticating an operator on the operation unit 219.

FIG. 6 illustrates an example of the authentication screen according to this embodiment.

Referring to FIG. 6, the authentication screen 600 contains a user ID input field 601, a password input field 602, a log in button 603, a cancel button 604, and a message 605.

In S506, whether the cancel button 604 on the authentication screen 600 has been pressed or not is determined. If it is determined that the cancel button 604 has been pressed, the operator is not authenticated. In this case, whether the operator has administrator authority or not may not be checked. Thus, the processing in the flowchart ends without displaying the version information.

It is determined in S506 that the cancel button 603 has not been pressed, the processing moves to S507 where whether the log in button 603 has been pressed or not is determined. If it is determined that the log in button has been pressed, the processing moves to S506. On the other hand, if it is determined that the log in button has been pressed, the processing moves to S508.

In S508, whether the operator having administrator authority has been authenticated or not is determined based on authentication information (passwords input to the user ID input field 601 and the password input field 602) input on the authentication screen 600. If it is determined in S508 that the operator having administrator authority has been authenticated, the processing moves to S504 where the version information on the firmware currently installed in the image forming apparatus 100 is displayed. On the other hand, if it is determined in S508 that the operator having administrator authority has not been authenticated, the processing returns to S505.

It should be noted that if it is determined in S508 that the operator having administrator authority has not been authenticated, the processing in the flowchart may end instead of the return to S505.

FIG. 12 illustrates an example of a screen showing version information on firmware according to this embodiment.

In S504, a version information screen 1200 illustrated in FIG. 12 is displayed. The version information screen 1200 includes display items 1202 to 1218.

A product name 1202 indicates the product name of the image forming apparatus 100. A main board version 1204 indicates the version of a substrate on which the components of the control unit 200 in the image forming apparatus 100 are mounted.

A firmware version 1206 indicates version information of firmware installed in the image forming apparatus 100. FIG. 12 illustrates that the version of firmware is 9.1 which means the firmware has a security specification configuration.

A memory A capacity 1208 and a memory B capacity 1210 indicate the capacities of the RAMs 212 in the control unit 200. While the display example in FIG. 12 has two RAMs 212 in the control unit 200 in the image forming apparatus 100, an embodiment of the present invention is not limited thereto.

A scanner version 1212 indicates version information on firmware for the scanner unit 221 installed in the flash memory 221b in the scanner unit 221.

A printer version 1214 indicates version information on firmware for the printer unit 220 installed in the flash memory 220b in the printer unit 220.

If an OK button 1216 is pressed, the version information screen 1200 is closed, and the operation unit 219 displays a predetermined screen or a screen before the version information screen 1200 is displayed.

By checking the version information screen 1200 as illustrated in FIG. 12, the version of the firmware installed in the image forming apparatus 100 may be checked. Thus, whether firmware having a security specification configuration is installed or not may be checked and thus whether the image forming apparatus 100 has a security specification configuration or not may be checked.

If it is determined in S503 that the operator of the image forming apparatus 100 is not an administrator, a screen as illustrated ion FIG. 13 may be displayed on the operation unit 219 instead of moving to the S505. FIG. 13 illustrates an example of a screen to be displayed on the operation unit 219 according to this embodiment. A screen 1300 in FIG. 13 shows masked information of the main board version 1204, firmware version 1206, scanner version 1212, and printer version 1214 on the version information screen 1200 illustrated in FIG. 12. The display of the screen 1300 may hide information that notifies an operator of its security specification configuration from an operator who does not have administrator authority.

Checking the version of firmware may desirably be permitted to a valid administrator only. According to this embodiment, firmware having a security specification configuration and firmware having a general specification configuration are managed as different versions. In an image forming apparatus having a security specification configuration, the firmware version information itself should be handled as confidential information. However, in a conventional image forming apparatus, limitation of accesses to firmware version information is not allowed. Execution of the processing in the flowchart in FIG. 10 allows limitation of an operator who is permitted to check a version in the image forming apparatus 100 having a security specification configuration, for which high security is required. This May reduce the possibility that the image forming apparatus 100 having security specification configuration is intentionally changed to have a general specification configuration.

It should be noted that the processing in the flowchart in FIG. 10 is applicable not only to a case where a firmware version is displayed on the operation unit 219 but also to a case where version information is visually output by other devices. For example, the processing is also applicable to a case where firmware version information is printed by the printer unit 220.

According to this embodiment, limitation of an operator who updates firmware may be allowed in accordance with the specification configuration of an image forming apparatus, which may improve the security of the image forming apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment of the present invention, and by a method performed by the computer of the system or apparatus by, for example, reading out and executing the computer executable instructions from the storage medium to perform the functions of one or more of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-186433, filed Sep. 9, 2013, which is hereby incorporated by reference herein in its entirety.

The invention claimed is:

1. An image forming apparatus in which firmware update is allowed, the image forming apparatus comprising: one or more storage devices; a display; and one or more processors configured to:
update firmware including plural firmware programs in the image forming apparatus,
receive an instruction to update the firmware in the image forming apparatus, execute the instruction to acquire a firmware type indicator corresponding to the firmware version wherein the firmware type indicator indicating whether the firmware of the firmware version: has the security specification configuration of the firmware in the image forming apparatus, wherein the firmware version information includes the firmware type indicator which indicates that the firmware has a security specification configuration,
identify an authority of an operator of the image forming apparatus, and prevent altering the firmware by updating at least one of the plural firmware programs in the firmware in the image forming apparatus in a case where the firmware, including the plural firmware programs, installed in the image forming apparatus is firmware of a security version which is verified as firmware complying with a predetermined security standard and the authority of the operator of the image forming apparatus is not verified as a predetermined authority,
wherein the firmware of the security version complying with the predetermined security standard is updated in accordance with an update instruction, only in a case where the update instruction is verified as the instruction associated with a predetermined authorized input by the operator,
wherein it is identified whether firmware has the security specification configuration based on the firmware version information including a firmware type indicator indicating whether the firmware has the security specification configuration on the firmware installed in the image forming apparatus,
and wherein the processor controls the display for a user who is not authenticated as IT manager to allow displaying version information of the firmware as IT manager in a case where the firmware type indicator corresponding to the firmware version does not indicate that the firmware has the security specification configuration and controls the display for a user who is not authenticated as IT manager not to display version information of the firmware in a case where the firmware type indicator corresponding to the firmware version indicates that the firmware has the security specification configuration.

2. The image forming apparatus according to claim 1, wherein, if the operator of the image forming apparatus has the predetermined authority, the image forming apparatus allows update of the firmware in the image forming apparatus.

3. The image forming apparatus according to claim 1, wherein the predetermined authority is an authority for defining a setting for the image forming apparatus.

4. The image forming apparatus according to claim 1, wherein the predetermined authority is an administrator authority.

5. The image forming apparatus according to claim 1, the one or more processors further configured to perform processing for authenticating an operator of the image forming apparatus, wherein the image forming apparatus identifies the authority of the operator.

6. The image forming apparatus according to claim 5, wherein the image forming apparatus displays a screen that prompts authentication of the operator on a display unit if the image forming apparatus does not authenticate the operator of the image forming apparatus when the image forming apparatus receives an instruction for firmware update in the image forming apparatus.

7. The image forming apparatus according to claim 6, wherein the image forming apparatus prevents the firmware update in the image forming apparatus if the operator instructs not to be authenticated on the displaying screen that prompts to authenticate the operator.

8. The image forming apparatus according to claim 1, wherein the image forming apparatus prevents visual output of information describing a version of firmware instated in the image forming apparatus if the firmware instated in the image forming apparatus is firmware of a specific type and if an operator of the image forming apparatus does not have the predetermined authority.

9. The image forming apparatus according to claim 1, wherein a plurality of types of firmware are allowed to be installed in the image forming apparatus, and the firmware of a specific type refers to firmware having a more tighten function relating the security of the image forming apparatus than other types of firmware.

10. A control method for an image forming apparatus in which firmware update is allowed, the control method comprising:
    updating firmware including plural firmware programs in the image forming apparatus;
    receiving an instruction to update the firmware in the image forming apparatus;
    executing the instruction to acquire a firmware type indicator corresponding to the firmware version wherein the firmware type indicator indicating whether the firmware of the firmware version has the security specification configuration of the firmware in the image forming apparatus, wherein the firmware version information includes the firmware type indicator which indicates that the firmware has a security specification configuration;
    identifying an authority of an operator of the image forming apparatus; and
    preventing altering the firmware by updating at least one of the plural firmware programs in the firmware n the image forming apparatus in a case where the firmware, including the plural firmware programs, installed in the image forming apparatus is firmware of a security version which is verified as firmware complying with a predetermined security standard and the authority of the operator of the image forming apparatus is not verified as a predetermined authority,
    wherein the firmware of the security version complying with the predetermined security standard is updated in accordance with an update instruction, only in a case where the update instruction is verified as the instruction associated with a predetermined authorized input by the operator,
    wherein it is identified whether firmware has the security specification configuration based on the firmware version information including a firmware type indicator indicating whether the firmware has the security specification configuration on the firmware installed in the image forming apparatus,
    and wherein the processor controls the display for a user who is not authenticated as IT manager to allow displaying version information of the firmware as IT manager in a case where the firmware type indicator corresponding to the firmware version does not indicate that the firmware has the security specification configuration and controls the display for a user who is not authenticated as IT manager not to display version information of the firmware in a case where the firmware type indicator corresponding to the firmware version indicates that the firmware has the security specification configuration.

11. A non-transitory computer-readable storage medium storing instructions of a computer program for causing an image forming apparatus in which firmware update is allowed to execute a control method, the control method comprising:
    updating firmware including plural firmware programs in the image forming apparatus;
    receiving an instruction to update the firmware in the image forming apparatus; executing the instruction to acquire a firmware type indicator corresponding to the firmware version wherein the firmware type indicator indicating whether the firmware of the firmware version has the security specification configuration of the firmware in the image forming apparatus, wherein the firmware version information includes the firmware type indicator which indicates that the firmware has a security specification configuration;
    identifying an authority of an operator of the image forming apparatus; and preventing altering the firmware by updating at least one of the plural firmware programs in the firmware in the image forming apparatus in a case where the firmware, including the plural firmware programs, installed in the image forming apparatus is firmware of a security version which is verified as firmware complying with a predetermined security standard and the authority of the operator of the image forming apparatus is not verified as a predetermined authority;
    wherein the firmware of the security version complying with the predetermined security standard is updated in accordance with an update instruction, only in a case where the update instruction is verified as the instruction associated with a predetermined authorized input by the operator,
    wherein it is identified whether firmware has the security specification configuration based on the firmware version information including a firmware type indicator indicating whether the firmware has the security specification configuration on the firmware installed in the image forming apparatus,
    and wherein the processor controls the display for a user who is not authenticated as IT manager to allow displaying version information of the firmware as IT manager in a case where the firmware type indicator corresponding to the firmware version does not indicate that the firmware has the security specification configuration and controls the display for a user who is not authenticated as IT manager not to display version information of the firmware in a case where the firmware type indicator corresponding to the firmware version indicates that the firmware has the security specification configuration.

* * * * *